June 13, 1961 P. D. BOLTON 2,988,304
AIRCRAFT ENGINE THRUST COMPENSATOR
Filed March 15, 1960 2 Sheets—Sheet 1

INVENTOR.
PAUL D. BOLTON
BY Schneider, Mattingly
& Huntley
ATTORNEYS

June 13, 1961     P. D. BOLTON     2,988,304
AIRCRAFT ENGINE THRUST COMPENSATOR
Filed March 15, 1960     2 Sheets-Sheet 2
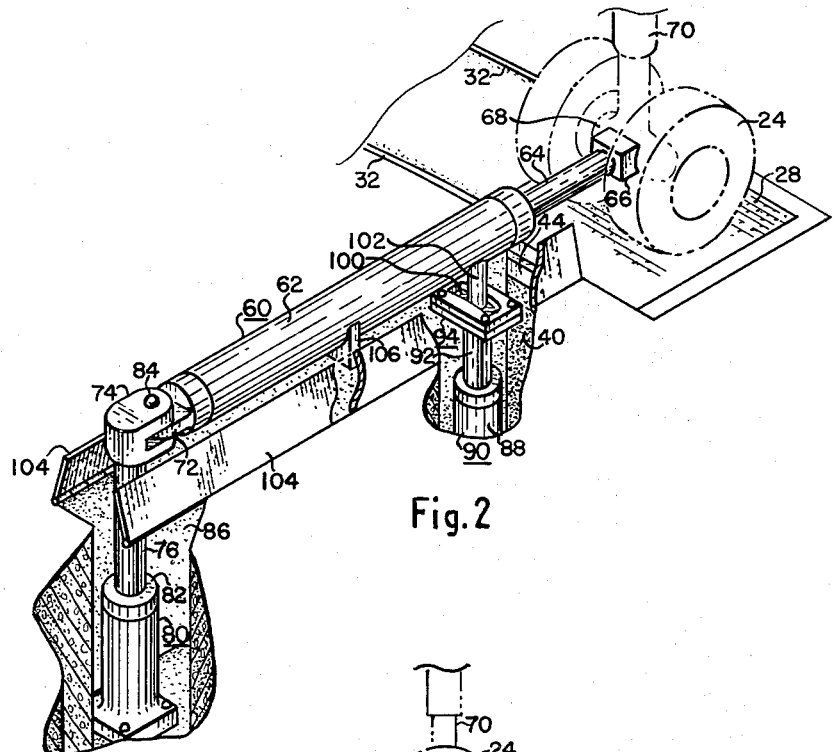
Fig. 2
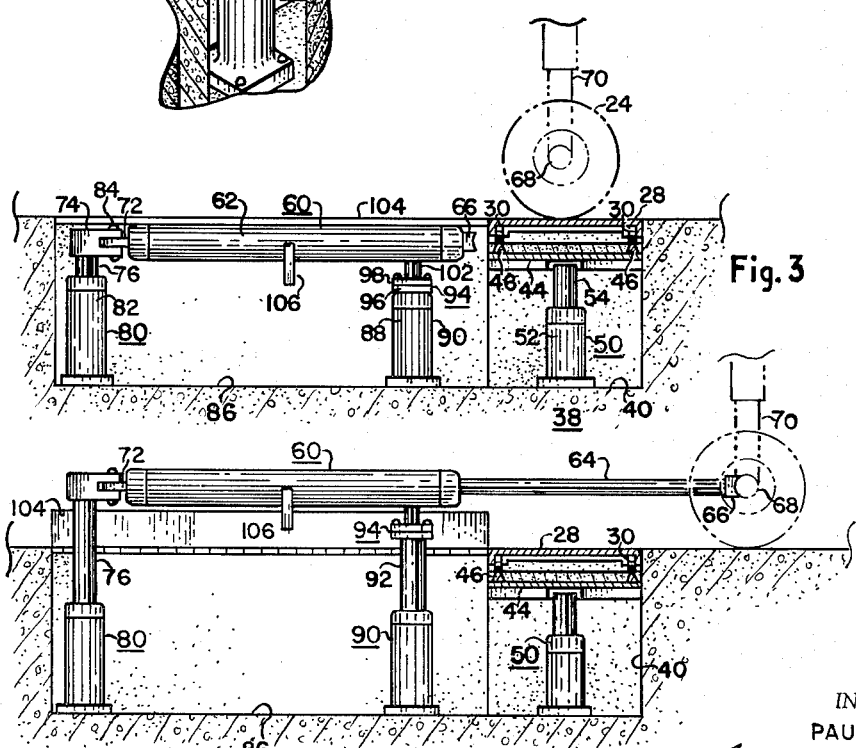
Fig. 3
Fig. 4
INVENTOR.
PAUL D. BOLTON
BY *Sulwider, Mattingly & Huntley*
ATTORNEYS

United States Patent Office 2,988,304
Patented June 13, 1961

2,988,304
AIRCRAFT ENGINE THRUST COMPENSATOR
Paul D. Bolton, 9610 Shadydale Lane, Dallas 18, Tex.
Filed Mar. 15, 1960, Ser. No. 15,167
4 Claims. (Cl. 244—63)

The present invention relates to a device for overcoming the static inertia of an aircraft and for imparting the initial movement of the craft along a runway.

At times, particularly when loaded to capacity, the power setting of the engine throttles is approximately eighty percent of the engine capacity. Under such circumstances, excessive noises are created by the engines and/or propellers; unconsumed gases are ejected from the engines at a loss of efficiency, and undesirable air currents are set up to the distress of the persons thereabout, not only in high winds but also in creating clouds of dust.

The present invention contemplates a device for imparting translatable movement to an aircraft from its static position and thus relieve the aircraft engines of the high energy necessary to start the movement of the aircraft along the runway.

In carrying out the present invention, I provide a substantially horizontally disposed jack, the ram of which is adapted to engage a part of the aircraft, preferably the nose gear, and when the ram is being extended it pushes forwardly on the aircraft to move the same from its static position.

A pit is provided for housing the jack when it is not in operation. This pit is provided with a cover disposed at ground level whereby it is normally covered and will not interfere with movement of the landing gear over the ground.

An elevator is used for raising the jack from and lowering the same into the pit. In the embodiment illustrated, the elevator comprises two jacks; one end of the jack is pivotally attached to one of the elevator jacks whereby the aircraft pushing jack can be moved in a substantially horizontal plane for ready alignment with that part of the aircraft to be pushed thereby. The opposite end of the pushing jack is slidably connected with the other of the elevating jacks to compensate for the horizontal position of the pushing jack.

Further objects and advantages will be apparent from the following description, reference being had to the accompanying drawings wherein a preferred embodiment of the invention is illustrated.

In the drawings:

FIG. 2 is a perspective view of the device for pushing the aircraft from its static position and showing the pushing jack elevated out of the pit;

FIG. 3 is a side view of the pushing device shown as disposed within a pit; and

FIG. 4 is a view similar to FIG. 3 but showing the pushing jack elevated from the pit and showing the ram of the jack extended to the position at which it pushes the aircraft.

Figure 1:
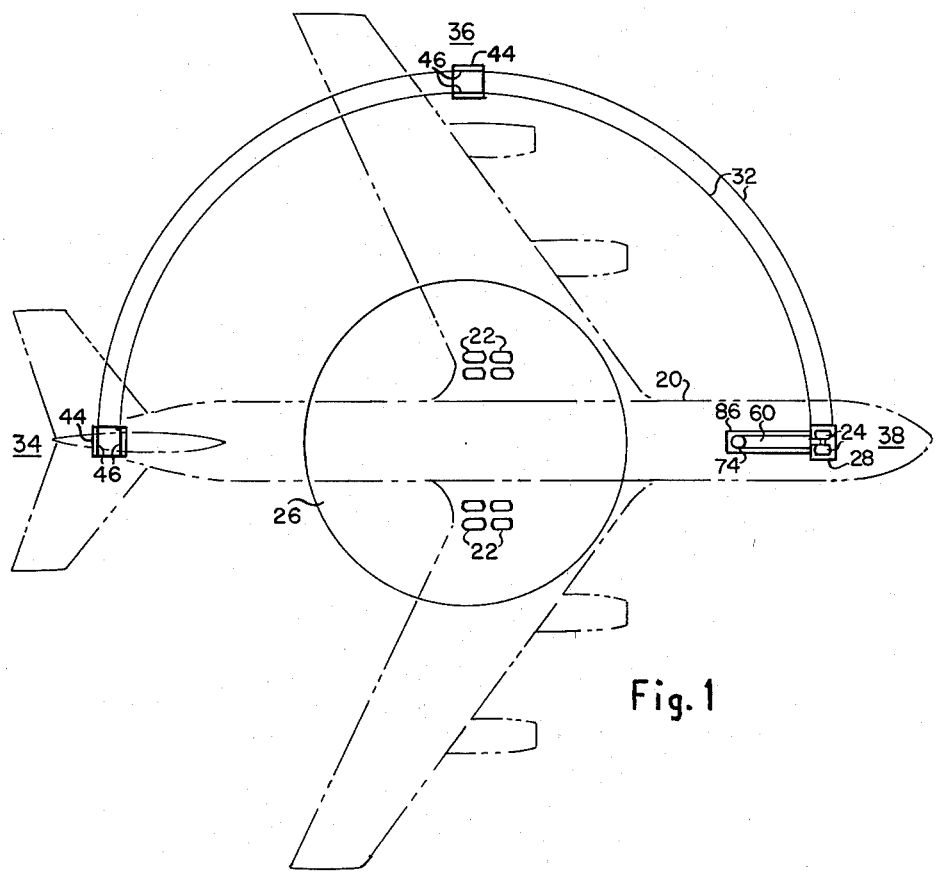
FIG. 1 is a top plan view showing the top of a turntable with an aircraft shown thereon in phantom.

Referring more in detail to the drawings and particularly to FIG. 1, the aircraft is shown in phantom at 20. The rear landing wheels are shown at 22 and the nose wheels at 24. The rear wheels 22 are shown as resting on a turntable platform 26. The nose wheels 24 are resting upon a dolly 28.

The dolly 28 is provided with four rollers 30 which ride upon tracks 32. The top of these tracks are disposed at ground level so as to permit the ready rolling of the aircraft thereover. The tracks 32 are provided with a plurality of stations shown at 34, 36 and 38. At each of these stations there is provided a pit 40 for receiving an elevator 42. The elevators are each provided with a platform 44 which carries tracks 46, which are aligned with the tracks 32. Normally the dolly 28 is disposed above the ground level as it is being moved across tracks 32. When the dolly reaches the desired pit, the elevator platform 44 is lowered so that the top of the dolly 28 is at ground level as is shown in FIGS. 3 and 4. The elevator includes a jack 50 having a cylinder 52 and a ram 54, the ram being fastened to the underside of the platform 44.

The structure thus far described is similar to that shown in my co-pending application Serial No. 692,910, filed October 28, 1957 for Aircraft Positioning and Locating System.

The pushing device for overcoming the static inertia of the aircraft comprises a jack 60 including a cylinder 62 and a ram 64. The head end 66 of the ram is arranged to engage the axle frame 68 for the wheels 24 of the nose gear 70 of the aircraft.

The rear end of the cylinder jack 62 is provided with an ear 72 which is pivoted for substantially horizontal swinging movement upon the head 74 of a ram 76 of a hydraulic jack 80. The jack also includes the cylinder 82. The pivot pin between the head 74 and ear 72 is shown at 84. This cylinder 82 is disposed in a pit 86. A second hydraulic cylinder 88 of a jack 90 is also disposed within the pit 86 and is provided with a ram 92. This hydraulic jack 90 is disposed forwardly of the jack 80 and is arranged through a sliding coupling 94 to engage the front end of the pushing jack 60. When the jacks 80 and 90 are retracted (and they are retracted and extended, respectively, concomitantly) the pushing jack 60 is in the position shown in FIG. 3. All three jacks are shown in their operating position in FIG. 4.

The slidable connection 94 between the ram 92 and the jack 60 comprises a lower plate 96 fastened to the upper end of ram 92 and an upper plate 98, suitably fastened to the lower plate 96. The upper plate 98 is provided with an arcuate slot 100 whose axis is substantially the same as the axis for the pivot pin 84. The lower front end of the cylinder 62 of jack 60 carries a stud 102 which extends downwardly through the slot 100 and rests upon the plate 96. The slot 100 permits limited horizontal movement of the jack 60 about the pivot pin 84, while the stud 102 rests upon the plate 96.

The operation of the device is as follows: After the dolly 28, with the nose wheels thereon, has reached the desired station, the platform 44 and dolly 28 are lowered to the position shown in FIG. 3. The hydraulic rams 76 and 92 of jacks 80 and 90, respectively, are then raised to the position shown in FIG. 4; at this time, however, the ram 64 is still retracted. After the jack 60 is elevated to the desired position, the ram 64 is projected part way so as to permit alignment of the head thereof with the axle frame 68 of the nose gear 70. As previously stated, the slot 100 permits sufficient horizontal movement of the jack 60 for alignment purpose. After the head 66 is at the desired position on the axle frame 68, the pushing jack is in condition for moving the aircraft. At this time the engines of the aircraft are brought into play, under low throttle condition. The ram 64 is then projected forwardly for moving the aircraft and at the same time the necessary controls are actuated by the pilot to increase the power of the engines. After the pushing movement is performed, the ram 64 of jack 60 is retracted and thereafter the rams 76 and 92, respectively, of the jacks 80 and 90, are retracted to lower the pushing jack 60 into the pit, that is, into the position shown in FIG. 3.

Hinged covers 104 are provided for the pit. These covers are automatically lifted by being engaged on the upper side by the jack 60 as the jack 60 is being raised. The opposite sides of the jack 60 are provided with webs, one of which is shown at 106, for retaining the covers 104 in open position when the pushing jack 60 is moved above the top of the covers. These covers may fall by gravity into position to cover the top of the pit 86 when the jack is retracted into the pit, or, suitable springs may be provided for closing the covers.

From the foregoing it will be seen that I have provided a relatively simple and inexpensive mechanism for overcoming the static inertia of an aircraft and for imparting the initial movement of the aircraft along the runway. By so doing the excessive noises, created by the engines, heretofore caused by the necessity for applying approximately eighty percent of the engine capacity, have been eliminated, and, in so doing, propeller noises have been materially reduced. Also, by carrying out the present invention the speed of the engines can be gradually increased whereby better combustion is attained and less unconsumed gases are ejected from the exhausts of the engines. Too, by gradually starting the aircraft through the pushing device, the engines' speeds are gradually increased, eliminating the excessive air disturbances heretofore necessary for moving the aircraft from the static position, and in so doing, not only the noises have been decreased but also far less dirt and dust is moved as the aircraft is being started.

While the form of embodiment herein shown and described constitutes a preferred form, it is to be understood that other forms may be adopted falling within the scope of the claims that follow.

I claim:

1. A device for imparting translatable movement to an aircraft, of the type having a propelling engine, for overcoming static inertia, which device comprises a horizontally disposed jack including a ram for engaging a part of the aircraft and a cylinder for the ram; means pivotally supporting the jack for swinging movement in a substantially horizontal plane; means forming a pit for the jack; means for raising the jack from and for lowering the same into the pit; and a cover for the pit disposed at ground level.

2. A device for imparting translatable movement to an aircraft, of the type having a propelling engine, for overcoming static inertia, which device comprises a horizontally disposed jack including a ram for engaging a part of the aircraft and a cylinder for the ram; means forming a pit for the jack; elevating means for raising the jack from and for lowering the same into the pit; means pivotally connecting the jack with the elevating means for movement of said jack in a substantially horizontal plane; and a cover for the pit disposed at ground level.

3. A device for imparting translatable movement to an aircraft, of the type having a propelling engine, for overcoming static inertia, which device comprises a horizontally disposed jack including a ram for engaging a part of the aircraft and a cylinder for the ram; means forming a pit for the jack; elevating means for raising the jack from and for lowering the same into the pit; means pivotally connecting one end of the jack with the elevating means for movement of the jack in a substantially horizontal plane, and a sliding support connecting the opposite end of the jack with the elevating means; and a cover for the pit disposed at ground level.

4. A device for imparting translatable movement to an aircraft, of the type having a propelling engine, for overcoming static inertia, which device comprises a horizontally disposed jack including a ram for engaging a part of the aircraft and a cylinder for the ram; means forming a pit for the jack; elevating means for raising the jack from and for lowering the same into the pit, said elevating means comprising two jacks; means pivotally connecting one end of the first mentioned jack with one of the elevating jacks for movement of the first mentioned jack in a substantially horizontal plane, and a substantially horizontal slidable support connecting the opposite end of the first mentioned jack with the other of the elevating jacks; and a cover for the pit disposed at ground level.

References Cited in the file of this patent

UNITED STATES PATENTS

| 1,792,000 | Carver | Feb. 10, 1931 |
| 2,083,805 | Adams | June 15, 1937 |

FOREIGN PATENTS

| 546,572 | Great Britain | July 20, 1942 |